(12) United States Patent
Howe et al.

(10) Patent No.: US 10,210,576 B2
(45) Date of Patent: Feb. 19, 2019

(54) PROCESSING PAYMENT CARD TRANSACTION RECORDS TO DETERMINE INSURANCE FRAUD RISK

(71) Applicant: MasterCard International Incorporated, Purchase, NY (US)

(72) Inventors: Justin X. Howe, San Francisco, CA (US); Randy Shuken, Westport, CT (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 496 days.

(21) Appl. No.: 14/921,576

(22) Filed: Oct. 23, 2015

(65) Prior Publication Data

US 2017/0116674 A1 Apr. 27, 2017

(51) Int. Cl.
*G06Q 40/00* (2012.01)
*G06Q 40/08* (2012.01)

(52) U.S. Cl.
CPC .................... *G06Q 40/08* (2013.01)

(58) Field of Classification Search
CPC ....... G06Q 40/00; G06Q 40/08; G06Q 40/025
USPC ..................................................... 705/4, 38
See application file for complete search history.

(56) References Cited

U.S. PATENT DOCUMENTS

| | | | |
|---|---|---|---|
| 6,181,814 B1 | 1/2001 | Carney | |
| 7,711,584 B2 | 5/2010 | Helitzer et al. | |
| 7,827,045 B2 | 11/2010 | Madill, Jr. et al. | |
| 8,355,934 B2 | 1/2013 | Virdhagriswaran | |
| 9,600,845 B2* | 3/2017 | Nordyke | G06Q 40/12 |
| 2002/0002475 A1 | 1/2002 | Freedman et al. | |
| 2003/0229587 A1* | 12/2003 | Arthus | G06Q 20/10 705/39 |
| 2004/0010426 A1 | 1/2004 | Berdou | |
| 2005/0108063 A1 | 5/2005 | Madill, Jr. et al. | |
| 2008/0288377 A1* | 11/2008 | Koukis | G06Q 30/00 705/30 |
| 2011/0313900 A1* | 12/2011 | Falkenborg | G06Q 20/227 705/30 |
| 2012/0011067 A1* | 1/2012 | Katzin | G06Q 20/027 705/44 |
| 2012/0215604 A1* | 8/2012 | Canetto | G06Q 30/0214 705/14.16 |
| 2012/0275651 A1 | 11/2012 | Brown | |
| 2013/0253596 A1* | 9/2013 | Crook | A61B 17/3037 606/308 |
| 2013/0346140 A1* | 12/2013 | Balko | G06F 9/5055 705/7.26 |
| 2015/0088554 A1* | 3/2015 | McKinney | G06Q 30/0238 705/4 |

(Continued)

OTHER PUBLICATIONS

Online Merchants Feel Sting of E-Commerce Fraud, Credit Risk Management Report8.21: NA. Access Intelligence, LLC. (Nov. 2, 1998).*

*Primary Examiner* — Lalita M Hamilton
(74) *Attorney, Agent, or Firm* — Armstrong Teasdale LLP

(57) ABSTRACT

A risk determination computing device for determining a risk of insurance fraud is provided. Additionally, a method for determining a risk of insurance fraud is provided. Further, a computer-readable storage medium having computer-executable instructions embodied thereon for determining a risk of insurance fraud is provided.

16 Claims, 9 Drawing Sheets

(56) References Cited

U.S. PATENT DOCUMENTS

| | | | |
|---|---|---|---|
| 2016/0335641 A1* | 11/2016 | White | G06Q 20/4016 |
| 2017/0076288 A1* | 3/2017 | Awasthi | G06Q 20/405 |

* cited by examiner

PROCESSING PAYMENT CARD TRANSACTION RECORDS TO DETERMINE INSURANCE FRAUD RISK

BACKGROUND

This disclosure relates to processing electronic signals associated with a payment network to determine a financial performance of a merchant, and more specifically to determining a level of risk that the merchant will commit insurance fraud based on data included in the signals.

Research has shown that at least some people experiencing financial difficulty commit insurance fraud in an attempt to lessen their financial burdens. For example, a person may intentionally destroy property that the person has an insurance policy on and attempt to collect money from the insurance company for the loss of the property. Such fraud occurs with respect to fire insurance, vehicle insurance, and other types of insurance. For another example, a person operating a business at a particular commercial property may experience a downturn in revenue and become financially distressed. In some cases, the person becomes so financially distressed that the person intentionally sets fire to the commercial property in an attempt to collect from an insurer where the person holds a fire insurance policy for the property. Similarly, a person may destroy their vehicle and report it missing, to collect on auto insurance.

Alternatively, a distressed merchant may take other unlawful actions to lessen their financial burden. For example, a merchant may submit payment authorization requests for fake purchases using stolen payment card information in an attempt to increase their revenue.

Accordingly, it would be beneficial to identify signs of impending insurance fraud before the fraud actually occurs, and notify insurance companies of the risk of fraud before it occurs so that the insurance companies can react accordingly. Additionally, even after the fraud occurs, it would be helpful to identify a likelihood of insurance fraud by the merchant, in order to estimate the likelihood that the merchant was involved in fraud.

BRIEF DESCRIPTION OF THE DISCLOSURE

In one aspect, a risk determination computing device for determining a risk of insurance fraud is provided. The risk determination computing device is in communication with a payment processing network and includes a memory for storing data and a processor in communication with the memory. The processor is configured to receive at least one transaction record signal including records of a plurality of financial transactions processed by the payment processing network for a first merchant at a first location. The processor is additionally configured to calculate a financial performance of the first merchant at the first location from the at least one transaction record signal, calculate an insurance risk score associated with at least the first location based on the financial performance, and transmit an insurance risk signal including a representation of the insurance risk score to an insurer computing device.

In another aspect, a method for determining a risk of insurance fraud is provided. The method is implemented by a risk determination computing device in communication with a payment processing network. The risk determination computing device includes one or more processors in communication with a memory. The method includes receiving, by the risk determination computing device, at least one transaction record signal including records of a plurality of financial transactions processed by the payment processing network for a first merchant at a first location. The method additionally includes calculating, by the risk determination computing device, a financial performance of the first merchant at the first location from the at least one transaction record signal. Additionally, the method includes calculating, by the risk determination computing device, an insurance risk score associated with at least the first location based on the financial performance and transmitting, by the risk determination computing device, an insurance risk signal including a representation of the insurance risk score to an insurer computing device.

In yet another aspect, a computer-readable storage medium having computer-executable instructions embodied thereon is provided. When executed by a risk determination computing device coupled to a payment network and having at least one processor coupled to a memory, the computer-executable instructions cause the risk determination computing device to receive at least one transaction record signal including records of a plurality of financial transactions processed by the payment processing network for a first merchant at a first location, calculate a financial performance of the first merchant at the first location from the at least one transaction record signal, calculate an insurance risk score associated with at least the first location based on the financial performance, and transmit an insurance risk signal including a representation of the insurance risk score to an insurer computing device.

BRIEF DESCRIPTION OF THE DRAWINGS

FIG. 1 is a schematic diagram illustrating an example multi-party payment card industry system for enabling payment-by-card transactions in which merchants and card issuers do not necessarily have a one-to-one relationship.

FIG. 2 is a simplified block diagram of an example payment processing system including a payment processing server computing device, a risk determination computing device, and a plurality of computing devices in accordance with one example embodiment of the present disclosure.

FIG. 3 is an expanded block diagram of a server architecture of the payment processing system including the plurality of computing devices in accordance with one example embodiment of the present disclosure.

FIG. 4 illustrates a configuration of a client system shown in FIGS. 2 and 3 in accordance with one example embodiment of the present disclosure.

FIG. 5 illustrates a configuration of a server system shown in FIGS. 2 and 3 in accordance with one example embodiment of the present disclosure.

FIG. 6 is a diagram of signals transmitted between an insurer computing device, the risk determination computing device, and the payment processing server computing device in accordance with an example embodiment of the present disclosure.

FIG. 7 is a diagram of a relationship between an insurance risk score calculated by the risk determination computing device and factors associated with the insurance risk score, in accordance with an example embodiment of the present disclosure.

FIG. 8 is a flowchart of an example process implemented by the risk determination computing device for determining a risk of insurance fraud in one example embodiment of the present disclosure.

FIG. 9 is a diagram of components of one or more example computing devices that may be used in the system shown in FIG. 2.

DETAILED DESCRIPTION OF THE DISCLOSURE

Figure 1:
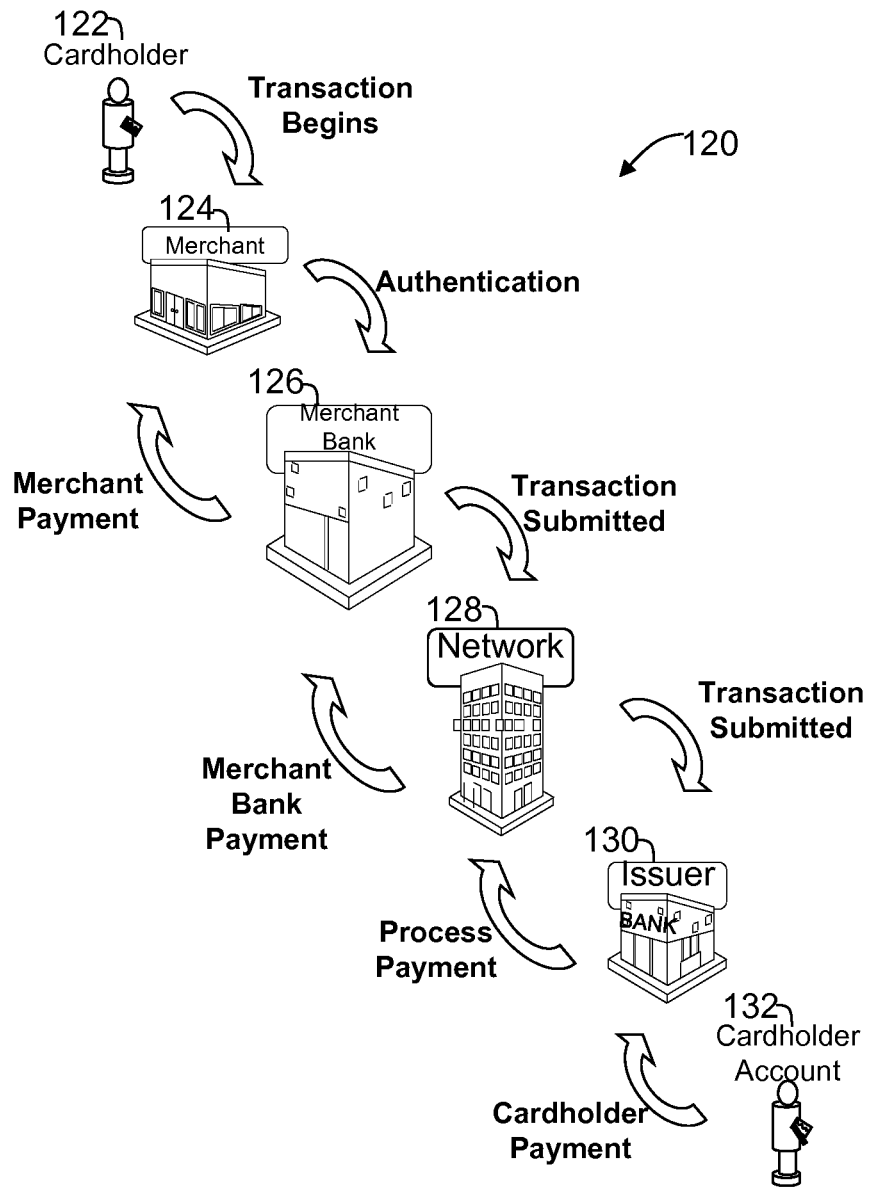
FIGS. 1-9 show example embodiments of the methods and systems described herein.

The system described herein includes a risk determination computing device that determines an insurance risk, for example, a risk of insurance fraud for a property. The risk determination computing device includes a processor coupled to a memory. Additionally, the risk determination computing device is in communication with a payment processing network. The risk determination computing device is configured to receive at least one transaction record signal that includes records of a plurality of financial transactions processed by the payment processing network for a first merchant at a first location. The risk determination computing device is additionally configured to calculate a financial performance of the first merchant at the first location from the at least one transaction record signal. Additionally, the risk determination computing device is configured to calculate an insurance risk score associated with at least the first location based on the financial performance. Further, the risk determination computing device is configured to transmit an insurance risk signal including a representation of the insurance risk score to an insurer computing device, wherein the insurer has previously provided an insurance policy to the first merchant.

In some implementations, the risk determination computing device is configured to calculate a number of chargebacks processed by the payment processing network based on the at least one transaction record signal. Further, in some such implementations, the risk determination computing device is configured to categorize each chargeback based on a flag indicated in each corresponding financial transaction record, calculate a number of chargebacks categorized as a collusive merchant chargeback, and calculate the insurance risk score based at least in part on the number of chargebacks categorized as collusive merchant chargebacks.

In some implementations, the risk determination computing device is configured to (i) identify, from the at least one transaction record signal, a first price for a particular product sold by the merchant at a first time based on the at least one transaction record signal, (ii) identify, from the at least one transaction record signal, a second price for the particular product sold by the merchant at a second time that is subsequent to the first time, (iii) determine an amount of change between the first price and the second price, and (iv) calculate the risk score based at least in part on the amount of change. For example, the merchant may have drastically lowered its prices in a going out of business sale.

In some implementations, the risk determination computing device is configured to estimate, from the at least one transaction record signal, a first economic status of a first set of customers that purchased products from the first merchant during a first time period. Further, the risk determination computing device is configured to estimate, from the at least one transaction record signal, a second economic status of a second set of customers that purchased products from the first merchant during a second time period that is subsequent to the first time period, determine an amount of change between the first economic status and the second economic status, and calculate the risk score based at least in part on the amount of change. More specifically, based on the types of purchases and/or locations of purchases associated with the sets of customers, the risk determination computing device determines an economic status profile for the different sets of customers. If the second set of customers appear to originate from a different demographic profile, the merchant may be selling products at a lower price in order to liquidate its inventory of products and go out of business.

In some implementations, the risk determination computing device is configured to receive a second transaction record signal including transactions processed by the payment processing network for merchants at a plurality of locations within a predefined geographic area that includes the first location. The risk determination computing device additionally determines a change in value of the predefined geographic area based at least in part on the second transaction record signal. For example, if one or more nearby merchants appear to be going out of business and/or are selling products that appeal to customers in a lower income bracket, the value of the neighborhood may be decreasing. The risk determination computing device calculates the risk score based at least in part on the change in value. For example, the merchant may choose to burn down the property and move to another geographic area that is not decreasing in value.

Additionally, in some implementations, the risk determination computing device is configured to determine a change in volume of financial transactions processed for the first merchant from a first time period to a second time period, based at least in part on the transaction record signal and calculate the risk score based at least in part on the change in volume. A decreasing number of transactions or total revenue may be a sign that the merchant is losing business and struggling economically.

In some implementations, the risk determination computing device is further configured to receive a risk request signal from an insurer computing device. The risk request signal includes the first location (e.g., an address). The risk determination computing device then transmits the insurance risk signal in response to the risk request signal. In some implementations, the risk determination computing device is configured to receive a risk request signal from an insurer computing device. The risk request signal includes the first location (e.g., address) and a first insurance premium associated with the first location (e.g., the premium that the insurance company currently charges the merchant for the location). Additionally, the risk determination computing device calculates a second insurance premium for the first location based on the risk score, and transmits the insurance risk signal to the insurer computing device. The insurance risk signal includes the second insurance premium.

Also, in some implementations, the risk determination computing device is configured to determine, from the at least one transaction record signal, a number of different payment accounts associated with the financial transactions processed by the payment processing network during a predefined time period. The risk determination computing device additionally estimates a number of different customers that visited the first location during a predefined time period, based at least in part on the number of different payment accounts. Additionally, the risk determination computing device determines a likelihood of a premises liability insurance claim, based on the number of different customers, and calculates the insurance risk score based at least in part on the likelihood of premises liability. More specifically, the higher the number of customers visiting the merchant's location, the higher the likelihood that one of the customers will be injured or at least claim to have been injured at the location (e.g., a slip and fall claim). In some implementations, the risk determination computing device is configured to determine the insurance risk score by determining a risk of at least one of fire insurance fraud, vehicle insurance fraud, and healthcare fraud based on the at least one transaction record signal. For example, with regard to the healthcare fraud, the merchant may be a doctor who, due to declining business, charges for medical procedures that he did not perform.

The methods and systems described herein may be implemented using computer programming or engineering techniques including computer software, firmware, hardware or any combination or subset thereof, wherein the technical effect is achieved by performing at least one of: (a) receiving at least one transaction record signal including records of a plurality of financial transactions processed by the payment processing network for a first merchant at a first location; (b) calculating a financial performance of the first merchant at the first location from the at least one transaction record signal; (c) calculating an insurance risk score associated with at least the first location based on the financial performance; and (d) transmitting an insurance risk signal including a representation of the insurance risk score to an insurer computing device. More specifically, a risk determination computing device described herein is specially programmed with computer code to perform the above processes. The technical effects described herein apply to the technical field of detecting signs of impending insurance fraud. The systems and methods described herein provide the technical advantage of identifying signs of impending insurance fraud before the fraud actually occurs and notifying insurance companies of the risk of the fraud. Insurance companies are thereby enabled to react accordingly, for example by increasing premiums, cancelling insurance policies, and/or notifying law enforcement of the identified risk, before or after the fraud occurs.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 120 for enabling payment-by-card transactions in which merchants and card issuers do not necessarily have a one-to-one relationship. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card or EMV chip and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor." In some instances, a merchant (e.g., merchant 124) stores payment card information associated with a cardholder (e.g., cardholder 122) and requests authorization from acquirer 126 using the stored payment card information, rather than reading the cardholder's account information from the payment card itself (i.e., a card-on-file (COF) transaction).

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

Figure 2:
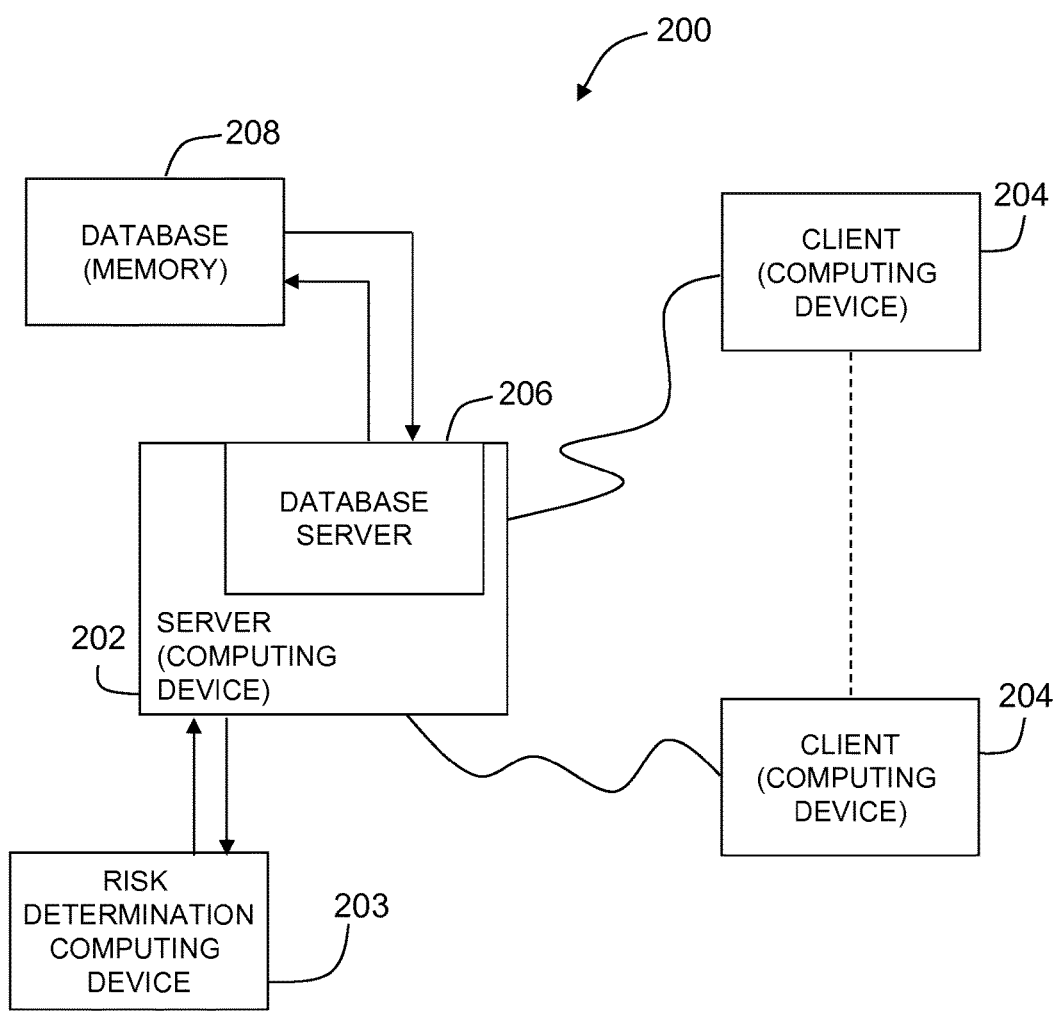

FIG. 2 is a simplified block diagram of an example payment processing system 200 with a risk determination computing device 203 in accordance with one embodiment of the present disclosure. In the example embodiment, system 200 includes a payment processing server computing device 202, risk determination computing device 203 and a plurality of client subsystems, also referred to as client systems 204 or client computing devices, connected to payment processing server computing device 202. In one embodiment, client systems 204 are computers including a web browser, such that risk determination computing device 203 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), or other web-connectable equipment. In one embodiment, client computing device 204 includes a point-of-sale (POS) device, a cardholder computing device (e.g., a smartphone, a tablet, or other computing device), or any other computing device capable of communicating with payment processing server computing device 202. A database server 206 is connected to a database 208 containing information on a variety of matters, as described below in greater detail. In one embodiment, database 208 is stored on risk determination computing device 203 and may be accessed by potential users at one of client systems 204 by logging onto risk determination computing device 203 through one of client systems 204, for example an insurer computing device 334 (FIG. 3), described in more detail herein. In any alternative embodiment, database 208 is stored remotely from risk determination computing device 203 and may be non-centralized. Risk determination computing device 203 could be any type of computing device configured to perform the steps described herein. As discussed below, payment transactions, merchant locations, geographic areas, and chargebacks are stored in database 208.

Figure 3:
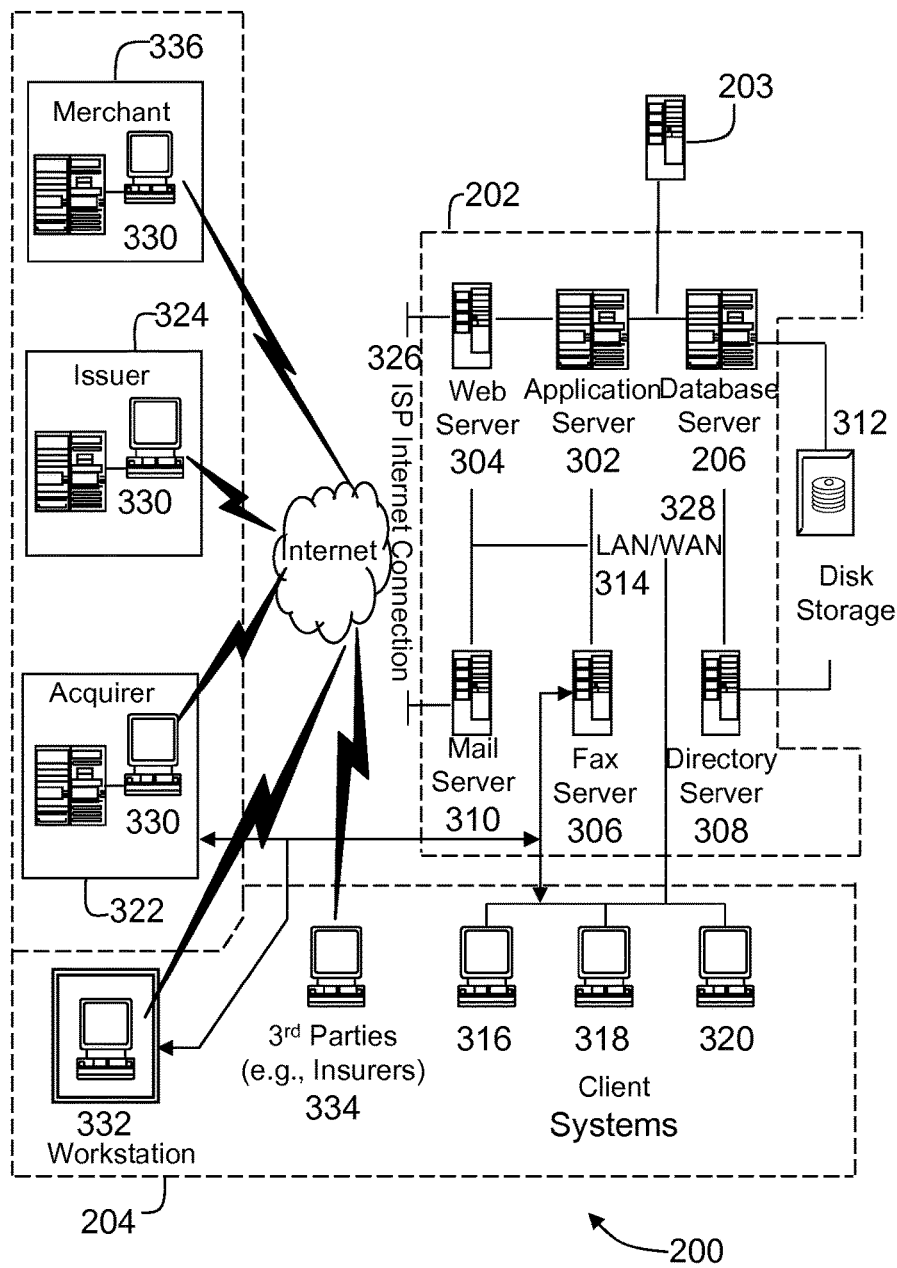

FIG. 3 is an expanded block diagram of an example embodiment of a server architecture of payment processing system 200 in accordance with one embodiment of the present disclosure. Payment processing system 200 includes payment processing server computing device 202, risk determination computing device 203, and client systems 204. Payment processing server computing device 202 includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Risk determination computing device 203 is configured to be communicatively coupled to various entities, including acquirers 322 and issuers 324, and to third parties, e.g., insurer computing devices 334 using an Internet connection 326. Server system 202 is also communicatively coupled with one or more merchants 336. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Also, workstations 330 and 332 are configured to communicate with risk determination computing device 203. Furthermore, fax server 306 communicates with remotely located client systems, including a client system 332, using a telephone link. Fax server 306 is configured to communicate with other client systems 316, 318, and 320 as well.

Figure 4:
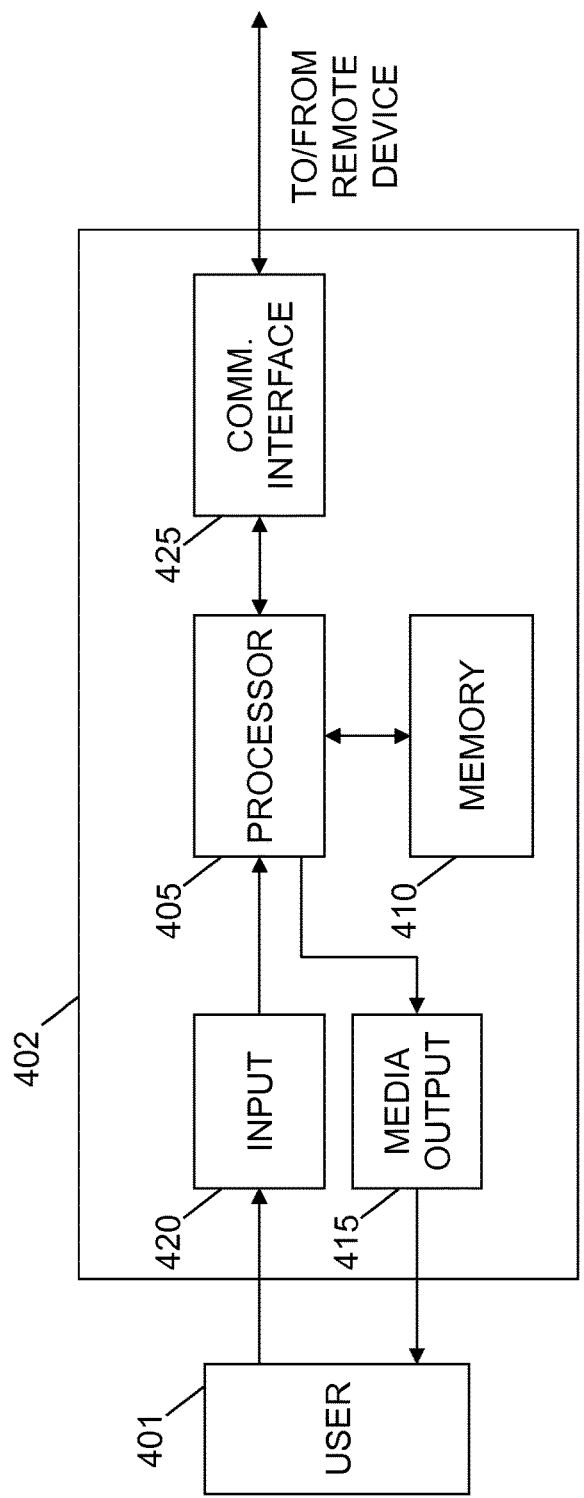

FIG. 4 illustrates an example configuration of a client computing device 402. Client computing device 402 may include, but is not limited to, client systems ("client computing devices") 204, 316, 318, and 320, workstation 330, manager workstation 332, and insurer computing device 334 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 122). Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Client computing device 402 may also include a communication interface 425, which is communicatively couplable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website from a web server associated with a merchant. A client application allows users 401 to interact with a server application associated with a merchant.

Figure 5:
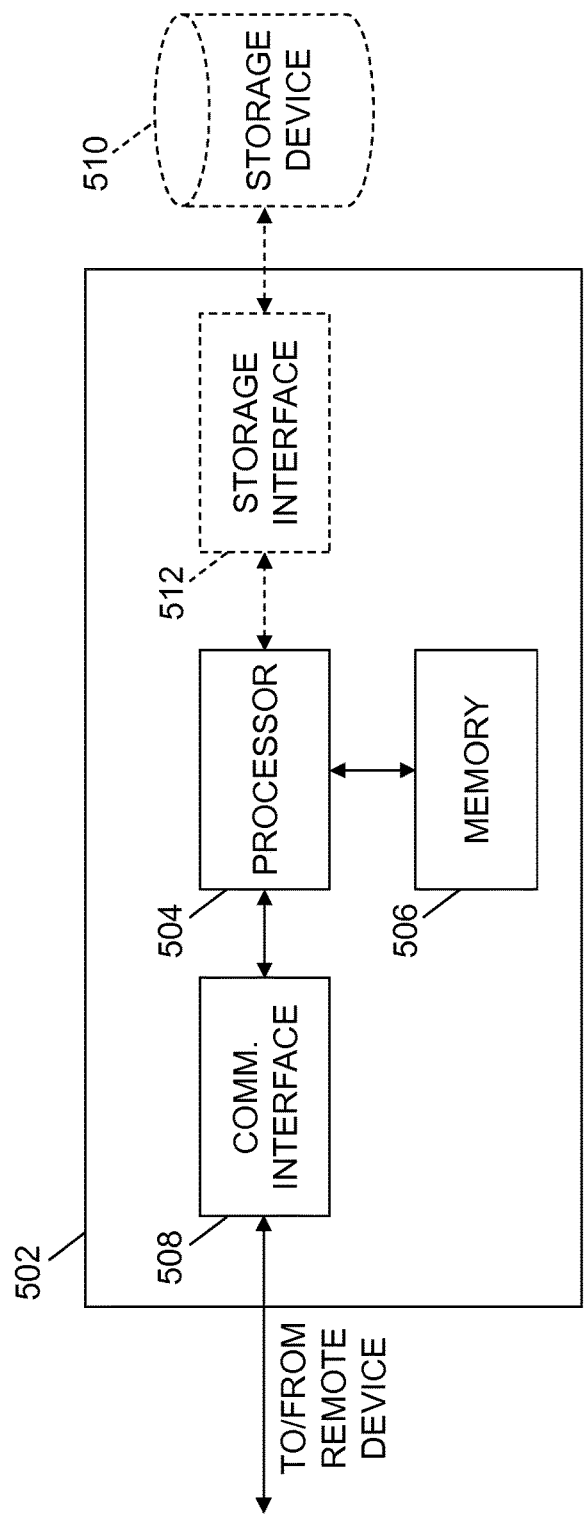

FIG. 5 illustrates an example configuration of a server computing device 502 such as payment processing server computing device 202 (shown in FIGS. 2 and 3). Server computing device 502 may include, but is not limited to, database server 206, application server 302, web server 304, fax server 306, directory server 308, and mail server 310.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
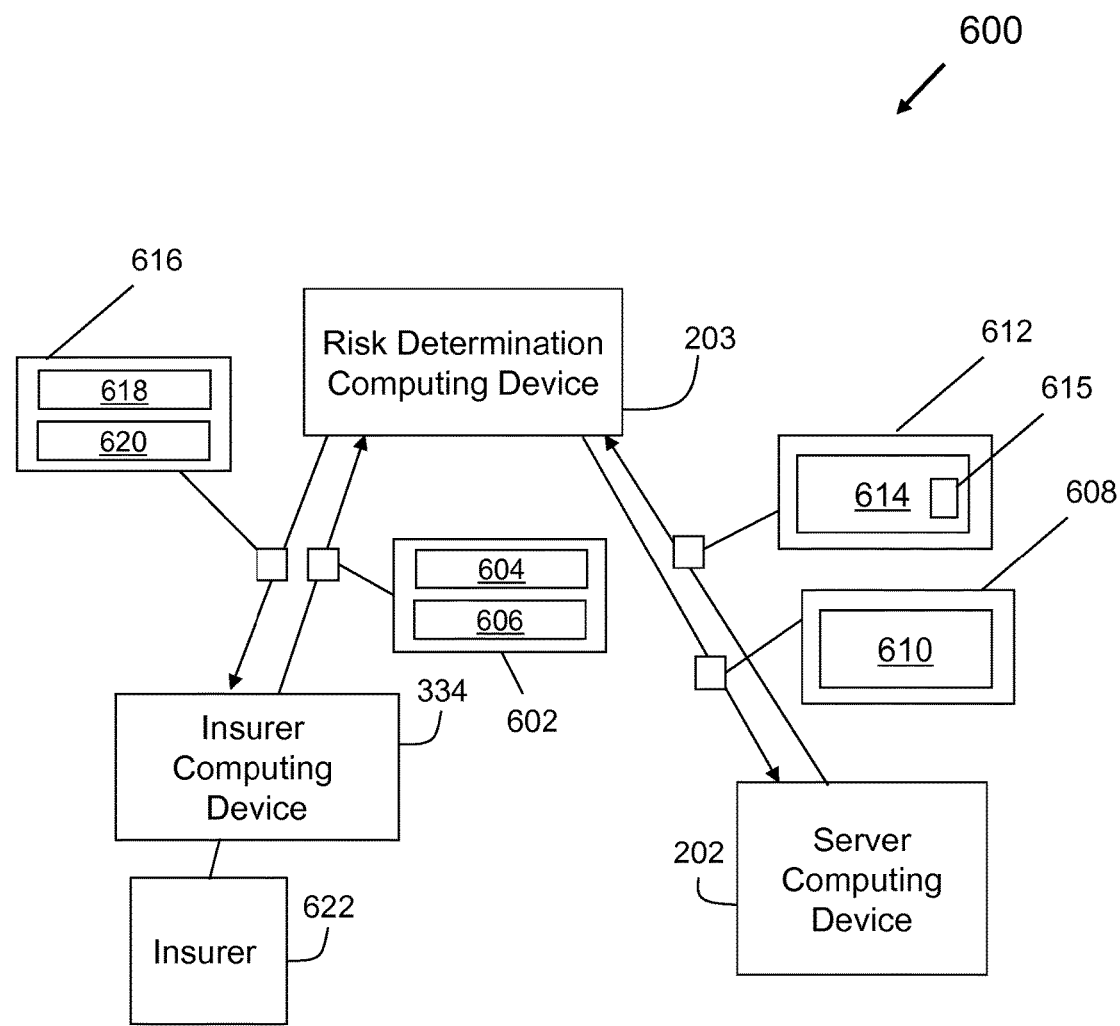

FIG. 6 is a diagram 600 of signals transmitted between insurer computing device 334, risk determination computing device 203, and payment processing server computing device 202 in an example embodiment of the present disclosure. Insurer computing device 334 transmits a request signal 602 to risk determination computing device 203. Request signal 602 includes a location 604, for example an address. More specifically, location 604 is an address of a property 712 (FIG. 7) (e.g., a building) that a merchant 124 conducts business in. An insurer 622 operating insurer computing device 334 wishes to determine a risk of insurance fraud, for example fire insurance fraud, associated with location 604. For example, the insurer 622 currently insures the property 712 at the location 604. In some implementations, request signal 602 additionally includes a first premium 606 currently charged by the insurer 622 for insuring the property 712 at location 604.

Risk determination computing device 203 transmits a record request signal 608 to payment processing server computing device 202. Record request signal 608 includes an identifier 610. In some implementations, identifier 610 identifies at least one of merchant 124 and location 604. For example, in some implementations, risk determination computing device 203 stores merchant identifiers (e.g., names, numbers, or codes) in association with locations (e.g., location 604) in memory (e.g., memory 410) and retrieves the corresponding merchant identifier (e.g., identifier 610) after receiving location 604 in request signal 602. In other implementations, risk determination computing device 203 does not store merchant identifiers in association with locations (e.g., location 604). Rather, in at least some implementations, payment processing server computing device 202 stores merchant identifiers (e.g., identifier 610) in association with locations (e.g., location 604) in memory (e.g., database 208).

Payment processing server computing device 202 transmits a transaction record signal 612 to risk determination computing device 203. Transaction record signal 612 includes one or more transaction records 614, for example retrieved from database 208. Transaction records 614 are payment transactions associated at least with merchant 124 associated with identifier 610. At least some transaction records 614 include one or more flags 615 that represent characteristics of the transaction (e.g., whether the transaction is a chargeback and/or a category of chargeback). In some implementations, transaction record signal 612 includes transaction records 614 for other merchants, for example, merchants located within a predefined geographic area 760 (FIG. 7) in which location 604 is situated. In some implementations, transaction record signal 612 is a plurality of signals, rather than a single signal (e.g., a first transaction record signal 612 including one or more transaction records 614 associated with merchant 124 and a second transaction record signal 612 including one or more transaction records 614 associated with other merchants within geographic area 760). Though risk determination computing device 203 is shown as being separate from payment processing server computing device 202, in some implementations, risk determination computing device 203 is included within payment processing server computing device 202.

Figure 7:
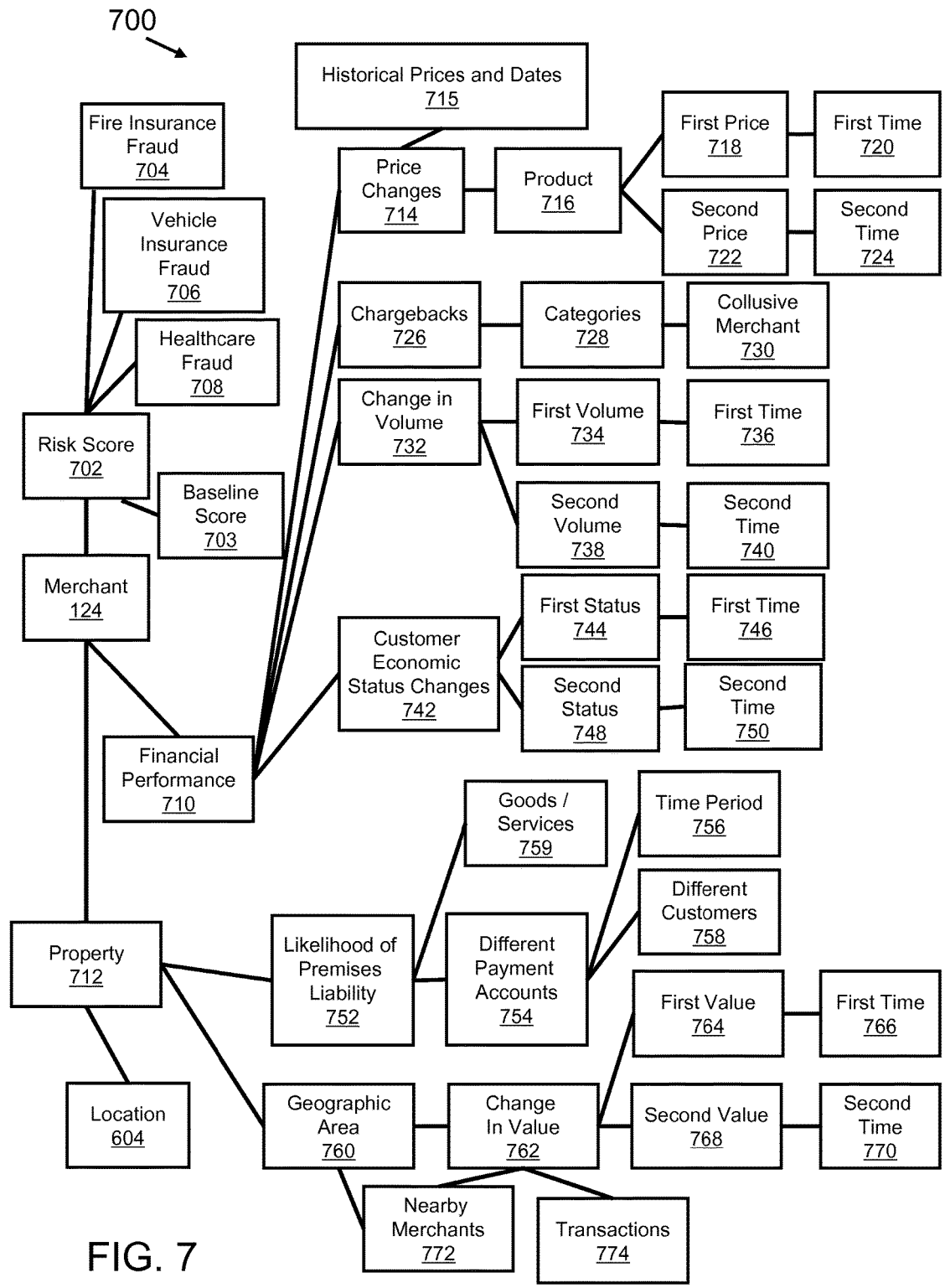

Risk determination computing device 203 calculates an insurance risk score 702 (FIG. 7) based on factors that risk determination computing device 203 identifies in and/or determines from transaction records 614, as described in more detail with reference to FIG. 7. Risk determination computing device 203 transmits an insurance risk signal 616 to insurer computing device 334. Insurance risk signal 616 includes a representation 618 of the insurance risk score 702 (FIG. 7). In some implementations, representation 618 is the insurance risk score 702 itself. In other implementations, representation 618 is a graphic, sound, textual description of the insurance risk score 702, or a recommendation based on the insurance risk score 702. In some implementations, insurance risk signal 616 includes a second premium 620, which risk determination computing device 203 calculates based at least in part on insurance risk score 702. For example, in some implementations, risk determination computing device 203 calculates second premium 620 by increasing first premium 606 based on insurance risk score 702. In other implementations, risk determination computing device 203 calculates second premium 620 by decreasing first premium 606 based on insurance risk score 702. Insurer computing device 334 outputs the representation 618 and/or second premium 620 to insurer 622, for example through media output component 415 (FIG. 4).

FIG. 7 is a diagram of a relationship 700 between an insurance risk score 702 calculated by risk determination computing device 203 and factors associated with the insurance risk score 702. Insurance risk score 702 represents a risk that merchant 124 will commit insurance fraud including, for example, one or more of fire insurance fraud 704, vehicle insurance fraud 706, and/or healthcare fraud 708. For example, merchant 124 may intentionally set fire to the building that merchant 124 operates in (e.g., property 712) if merchant 124 is struggling financially, in an attempt to collect money from an insurer (e.g., insurer 622) of the building (e.g., property 712). Likewise, merchant 124 may destroy one or more vehicles (e.g., property 712) operated by merchant 124 to collect from an insurer (e.g., insurer 622) after reporting the one or more vehicles as stolen. In instances where merchant 124 performs healthcare services, merchant 124 may charge a healthcare insurer (e.g., insurer 622) for services that merchant 124 did not actually perform. In some implementations, risk determination computing device 203 calculates risk score 702 by initially setting risk score 702 to a baseline score 703 and then increasing or decreasing risk score 702 based on factors described herein. Baseline score 703 is for example, an average risk score based on historical insurance risks associated with (i) merchants in a geographic area 760 where merchant 124 is located and/or (ii) merchants that sell goods and/or services that merchant 124 sells.

Risk determination computing device 203 calculates a financial performance 710 of merchant 124 using transaction records 614 (FIG. 6). In calculating financial performance 710, risk determination computing device 203 analyzes one or more of price changes 714 in products sold by merchant 124, chargebacks 726 for transactions associated with merchant 124, a change in volume 732 (e.g., a change in total revenue or number of transactions), and customer economic status changes 742. More specifically, with regard to price changes 714, risk determination computing device 203 identifies a product 716 that was sold by merchant 124, for example by detecting a stock keeping unit (SKU) or other unique identifier of product 716 in transaction records 614 during a first time 720 (e.g., a first month) and during a second time 724 (e.g., a subsequent month). Risk determination computing device 203 determines a first price 718 that merchant 124 sold product 716 for in the first time 720 and a second price 722 that merchant 124 sold product 716 for in the second time 724. If the second price 722 is lower than the first price 718, risk determination computing device 203 may determine that merchant 124 is struggling to sell off inventory and/or conducting a going out of business sale. Conversely, if second price 722 is greater than first price 718, risk determination computing device 203 determines that merchant 124 is able to sell the same product 716 at a higher price, and may not be struggling financially. In some implementations, risk determination computing device 203 cross references a set of historical prices and dates 715 to determine whether second price 722 was decreased due to a weekend sale, a holiday, or other event when merchant 124 has historically reduced prices. In instances where a reduction in prices at second time 724 correlates with historically lower prices during the same time, risk determination computing device 203 may ignore price changes 714 or apply a lesser weight to price changes 714 as compared to other factors described herein. While price changes 714 are one factor corresponding to the financial performance 710 of merchant 124, some implementations of risk determination computing device 203 analyze additional or alternative factors of financial performance 710, such as chargebacks 726, change in volume 732, and/or customer economic status changes 742, described in more detail below.

Risk determination computing device 203 detects, quantifies, and analyzes chargebacks 726 in transaction records 614. Chargebacks 726 are demands by issuers (e.g., issuer 130) for a merchant (e.g., merchant 124) to compensate the issuer for a disputed or fraudulent transaction. Chargebacks 726 may occur for a variety of reasons, each associated with a different category 728. In at least some implementations, risk determination computing device 203 quantifies chargebacks 726 categorized in a collusive merchant category 730, for example by a corresponding chargeback code (e.g., flag 615) included in the respective transaction records 614. A collusive merchant chargeback is generated by an issuer when the issuer suspects that the merchant (e.g., merchant 124) participated in fraudulent collusive activity with another party, for example by knowingly initiating transactions using a stolen payment card. The presence and number of collusive merchant chargebacks affect insurance risk score 702. Specifically, more chargebacks 726 categorized in the collusive merchant category 730 lead to a higher insurance risk score 702 while fewer chargebacks 726 categorized in the collusive merchant category 730 lead to a lower insurance risk score 702.

Risk determination computing device 203 calculates the change in volume 732 associated with merchant 124 between a first time 736 (e.g., a first month) and a second time 740 (e.g., a subsequent month). For example, risk determination computing device 203 calculates a first volume 734 by totaling the number of transaction records 614 associated with merchant 124 for the first time 736 and calculates a second volume 738 by totaling the number of transaction records 614 associated with merchant 124 for the second time 750. In some implementations, risk determination computing device 203 calculates first volume 734 by summing transaction amounts (i.e., prices 718) for all transaction records 614 in first time 746 and calculates second volume 738 by summing transaction amounts (i.e., prices 722) for all transactions records 614 in second time 740. Risk determination computing device 203 then calculates change in volume 732 by determining the difference between the first volume 734 and the second volume 738.

Risk determination computing device 203 identifies customer economic status changes 742 between a first time 746 (e.g., a first month) and a second time 750 (e.g., a subsequent month). More specifically, based on the types of purchases and/or locations of purchases associated with the sets of customers (e.g., cardholders 122), risk determination computing device 203 determines an economic status profile (e.g., first status 744 and second status 748) for the different sets of customers (e.g., cardholders 122). More specifically, risk determination computing device 203 requests transaction records 614 from payment processing server computing device 202 for purchases and/or locations of purchases (i.e., locations of merchants) associated with cardholder accounts that also made purchases from merchant 124 in the first time 746. Risk determination computing device 203 additionally requests transaction records 614 from payment processing server computing device 202 for purchases and/or locations of purchases (i.e., locations of merchants) associated with cardholder accounts that also made purchases from merchant 124 in the second time 750. Risk determination computing device 203 stores, in memory 410, reference products and reference merchant locations in association with respective economic status categories and compares the transaction records 614 described above to the stored reference products and reference merchant locations to estimate the economic status (e.g., first status 744 and second status 748) of the cardholders 122. If the second set of customers (e.g., cardholders 122) appear to originate from a different demographic profile (e.g., second status 748), such as a lower income bracket, than the first set of customers, then merchant 124 may be selling products at a lower price in order to liquidate its inventory of products and go out of business. Accordingly, risk determination computing device 203 generates a higher insurance risk score 702 in instances where second status 748 is lower than first status 744.

In addition to factors associated with financial performance 710, risk determination computing device 203 analyzes factors associated with property 712. For example, in some implementations, property 712 is a building in which merchant 124 conducts business and is located at location 604. Risk analysis computing device 203 determines a likelihood of premises liability 752 associated with property 712 (e.g., a likelihood of a customer suing merchant 124 for being injured on property 712). If property 712 subjects merchant 124 to a relatively high likelihood of premises liability 752, coupled with decreasing financial performance 710, merchant 124 may be incentivized to exit the business by committing fire insurance fraud (i.e., intentionally burning down the property 712) and attempting to collect money from insurer 622. Risk determination computing device 203 calculates likelihood of premises liability 752 by identifying a number of different payment accounts 754 used to make purchases from merchant 124 during time period 756 (e.g., a month).

Risk determination computing device 203 associates the number of different payment accounts 754 with a number of different customers 758 visiting property 712 within time period 756. A given customer may use multiple different payment accounts 754 within time period 756. Likewise, a given payment card account may be used to purchase on behalf of multiple people at property 712 (e.g., a parent purchasing food for a family). Accordingly, the number of different customers 758 is, at least in some implementations, an approximation rather than the actual number of different customers that visited property 712 during time period 756. Given that the likelihood of premises liability 752 is influenced by the amount of people at property 712, risk determination computing device 203 assigns a relatively high likelihood of premises liability 752 to property 712 for a relatively high number of different customers 758, and assigns a relatively low likelihood of premises liability 752 to property 712 for a relatively low number of different customers 758 (e.g., as compared to other properties 712 of other merchants).

In some implementations, risk determination computing device 203 additionally or alternatively accounts for a nature of goods or services 759 sold by merchant 124 in determining the likelihood of premises liability 752. More specifically, in some implementations, risk determination computing device 203 stores, in memory 410, risk levels and associated goods and/or services. Risk determination computing device 203 determines the types of goods and/or services 759 sold by merchant 124 at property 712, for example from item descriptions or other identifiers (e.g., SKUs) in transaction records 614, and compares the types of goods and/or services 759 to the stored goods and/or services and associated risk levels to determine the risk level associated with the goods and/or services 759 sold by merchant 124.

In at least some implementations, risk determination computing device 203 analyzes a geographic area 760 in which property 712 is located. Coupled with decreasing financial performance 710, risk determination computing device 203 may determine that a negative change in value 762 of geographic area 760 may be at least partially responsible for merchant's decreasing financial performance 710. For example, customers that previously purchased from merchant 124 subsequently avoid merchant 124 because the geographic area 760 (e.g., neighborhood) has changed to no longer match the economic status (e.g., status 744) of the customers and/or has become more dangerous. Risk determination computing device 203 determines a first value 764 of geographic area 760 at a first time (e.g., a first year) and a second value 768 of geographic area 760 at a subsequent time (e.g., a subsequent year). Risk determination computing device 203 then determines the change in value 762 by comparing the first value 764 to the second value 768. In some implementations, risk determination computing device 203 determines the first value 764 and the second value 768 by analyzing transactions 774 (e.g., transaction records 614) associated with nearby merchants 772 and determining that a financial performance 710 at each of the first time 766 and second time 770 for the nearby merchants 772 using, the processes described above. If geographic area 760 is declining in value, merchant 124 may be incentivized to burn down the property 712 and relocate to a new geographic area using money from insurer 622.

Figure 8:
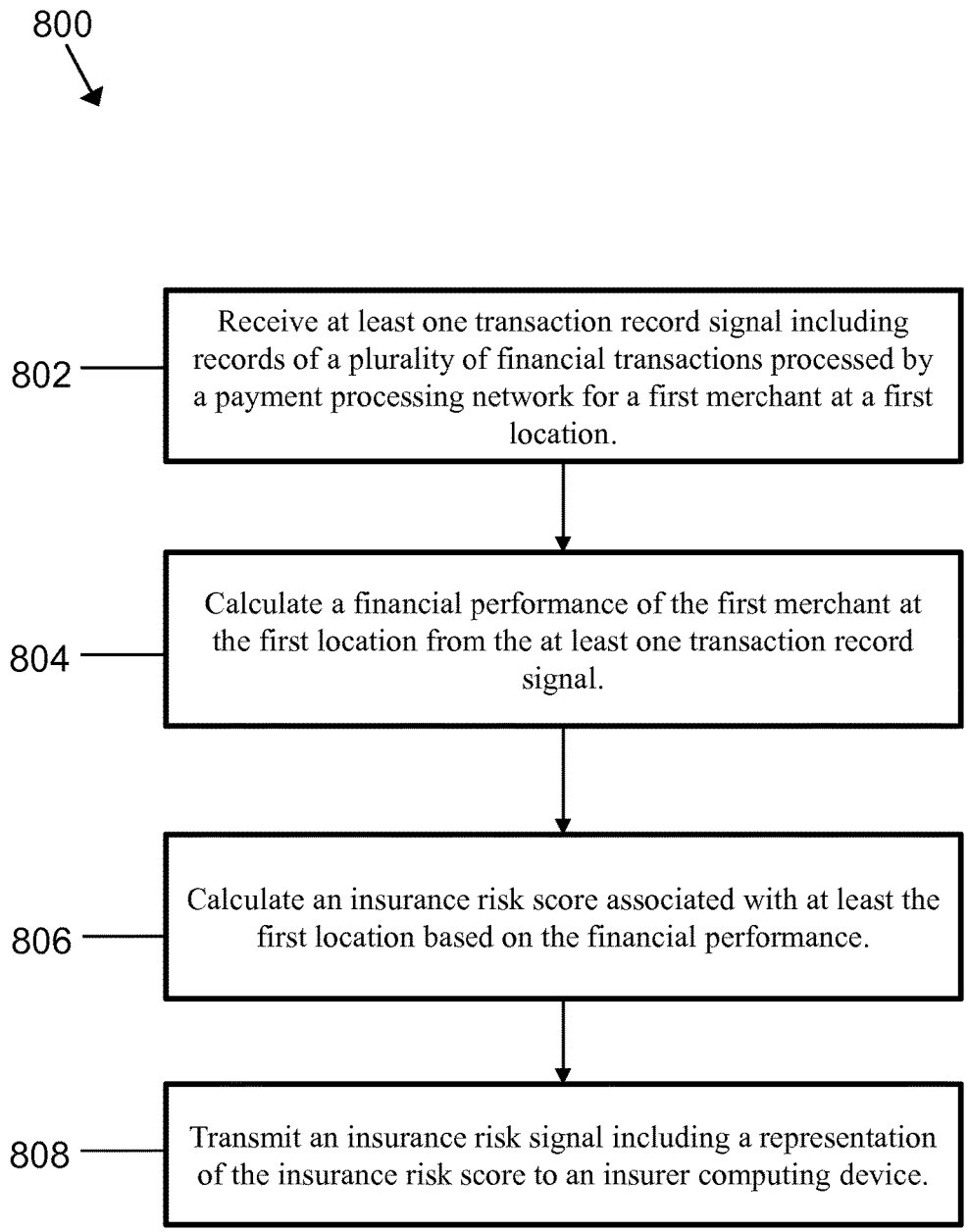

FIG. 8 is a flowchart of an example process 800 implemented by the risk determination computing device 203 for determining insurance risk, such as a risk that merchant 124 will commit insurance fraud. Initially, risk determination computing device 203 receives 802 at least one transaction record signal (e.g., transaction record signal 612) that includes records (e.g., transaction records 614) of a plurality of financial transactions processed by a payment processing network (e.g., payment network 128) for a first merchant (e.g., merchant 124) at a first location (e.g., location 604). Additionally, risk determination computing device 203 calculates 804 a financial performance (e.g., financial performance 710) of the first merchant (e.g., merchant 124) at the first location (e.g., location 604) from the at least one transaction record signal (e.g., transaction record signal 612). Additionally, risk determination computing device 203 calculates 806 an insurance risk score (e.g., insurance risk score 702) associated with at least the first location (e.g., location 604) based on the financial performance (e.g., financial performance 710). Additionally, risk determination computing device 203 transmits 808 an insurance risk signal (e.g., insurance risk signal 616) including a representation of the insurance risk score (e.g., insurance risk score 702) to an insurer computing device 334.

In some implementations, risk determination computing device 203 calculates a number of chargebacks (e.g., chargebacks 726) processed by the payment processing network (e.g., payment network 128) based on the at least one transaction record signal (e.g., transaction record signal 612). In some implementations, risk determination computing device 203 additionally categorizes each chargeback (e.g., chargeback 726) based on a flag (e.g., flags 615) indicated in each corresponding financial transaction record (transaction records 614). Further risk determination computing device 203 calculates a number of chargebacks (e.g., chargebacks 726) categorized as collusive merchant chargebacks (e.g., collusive merchant category 730) and calculates the insurance risk score (e.g., insurance risk score 702) based at least in part on the number of chargebacks (e.g., chargebacks 726) categorized as collusive merchant chargebacks (e.g., collusive merchant category 730).

In some implementations, risk determination computing device 203 identifies, from the at least one transaction record signal (e.g., transaction record signal 612), a first price (e.g., first price 718) for a particular product (e.g., product 716) sold by the merchant (e.g., merchant 124) at a first time (e.g., first time 720) based on the at least one transaction record signal (e.g., transaction record signal 612). Additionally, risk determination computing device 203 identifies, from the at least one transaction record signal (e.g., transaction record signal 612), a second price (e.g., second price 722) for the particular product (e.g., product 716) sold by the merchant (e.g., merchant 124) at a second time (e.g., second time 724) that is subsequent to the first time (e.g., first time 720). Additionally, risk determination computing device 203 determines an amount of change (e.g., price change 714) between the first price (e.g., first price 718) and the second price (e.g., second price 722), and calculates the risk score (e.g., insurance risk score 702) based at least in part on the amount of change (e.g., price change 714).

In some implementations, risk determination computing device 203 additionally estimates, from the at least one transaction record signal (e.g., transaction record signal 612), a first economic status (e.g., first status 744) of a first set of customers (e.g., cardholders 122) that purchased products from the first merchant (e.g., merchant 124) during a first time period (e.g., first time 746). Additionally, risk determination computing device 203 estimates, from the at least one transaction record signal (e.g., transaction record signal 612), a second economic status (e.g., second status 748) of a second set of customers (e.g., cardholders 122) that purchased products from the first merchant (e.g., merchant 124) during a second time period (e.g., second time 750) that is subsequent to the first time period (e.g., first time 746). Additionally, risk determination computing device 203 determines an amount of change (e.g., customer economic status change 742) between the first economic status (e.g., first status 744) and the second economic status (e.g., second status 748), and calculates the risk score (e.g., insurance risk score 702) based at least in part on the amount of change (e.g., customer economic status change 742).

In some implementations, risk determination computing device 203 receives a second transaction record signal (e.g., transaction record signal 612) that includes transactions (e.g., transactions 774) processed by the payment processing network (e.g., payment network 128) for merchants (e.g., nearby merchants 772) at a plurality of locations within a predefined geographic area (e.g., geographic area 760) that includes the first location (e.g., location 604). Additionally, risk determination computing device 203 determines a change in value (e.g., change in value 762) of the predefined geographic area (e.g., geographic area 760) based at least in part on the second transaction record signal (e.g., transaction record signal 612). Additionally, risk determination computing device 203 calculates the risk score (e.g., insurance risk score 702) based at least in part on the change in value (e.g., change in value 762).

In some implementations, risk determination computing device 203 additionally determines a change in volume (e.g., change in volume 732) of financial transactions (e.g., transaction records 614) processed for the first merchant (e.g., merchant 124) from a first time period (e.g., first time 736) to a second time period (e.g., second time 740), based at least in part on the transaction record signal (e.g., transaction record signal 612). Additionally, risk determination computing device 203 calculates the risk score (e.g., insurance risk score 702) based at least in part on the change in volume (e.g., change in volume 732).

In some implementations, risk determination computing device 203 receives a risk request signal (e.g., request signal 602) from an insurer computing device (e.g., insurer computing device 334). The risk request signal (e.g., request signal 602) includes the first location (e.g., location 604). Additionally, risk determination computing device 203 transmits the insurance risk signal (e.g., insurance risk signal 616) in response to the risk request signal (e.g., request signal 602).

In some implementations, risk determination computing device 203 receives a risk request signal (e.g., request signal 602) from an insurer computing device (e.g., insurer computing device 334). The risk request signal (e.g., request signal 602) includes the first location (e.g., location 604) and a first insurance premium (e.g., first premium 606) associated with the first location (e.g., location 604). Additionally, risk determination computing device 203 calculates a second insurance premium (e.g., second premium 620) for the first location (e.g., location 604) based on the risk score (e.g., insurance risk score 702). Additionally, risk determination computing device 203 transmits the insurance risk signal (e.g., insurance risk signal 616) to the insurer computing device (e.g., insurer computing device 334) including the second insurance premium (e.g., second premium 620).

In some implementations, risk determination computing device 203 determines, from the at least one transaction record signal (e.g., transaction record signal 612), a number of different payment accounts (e.g., different payment accounts 754) associated with the financial transactions (e.g., transaction records 614) processed by the payment processing network (e.g., payment network 128) during a predefined time period (e.g., time period 756). Additionally, risk determination computing device 203 estimates a number of different customers (e.g., different customers 758) that visited the first location (e.g., location 604 of property 712) during a predefined time period (e.g., time period 756), based at least in part on the number of different payment accounts (e.g., different payment accounts 754). Additionally, risk determination computing device 203 determines a likelihood of a premises liability insurance claim (e.g., likelihood of premises liability 752) based on the number of different customers (e.g., different customers 758) and calculates the insurance risk score (e.g., insurance risk score 702) based at least in part on the likelihood of premises liability (e.g., likelihood of premises liability 752).

In some implementations, risk determination computing device 203 determines the insurance risk score (e.g., insurance risk score 702) by determining a risk of at least one of fire insurance fraud (e.g., fire insurance fraud 704), vehicle insurance fraud (e.g., vehicle insurance fraud 706), and healthcare fraud (e.g., healthcare fraud 708) based on the at least one transaction record signal (e.g., transaction record signal 612).

Additionally, in some implementations, risk determination computing device 203 generates initial values of variables through back testing to estimate risk. For example, in some implementations, risk determination computing device 203 analyzes identities and actions of merchants (e.g., merchant 124) that committed insurance fraud in the past and correlates the identities and actions of the merchants to transaction data variables (e.g., price changes 714, chargebacks 726, change in volume 732). After generating such initial values for the variables, risk determination device 203 determines insurance risk scores (e.g., insurance risk score 702) as described above.

Figure 9:
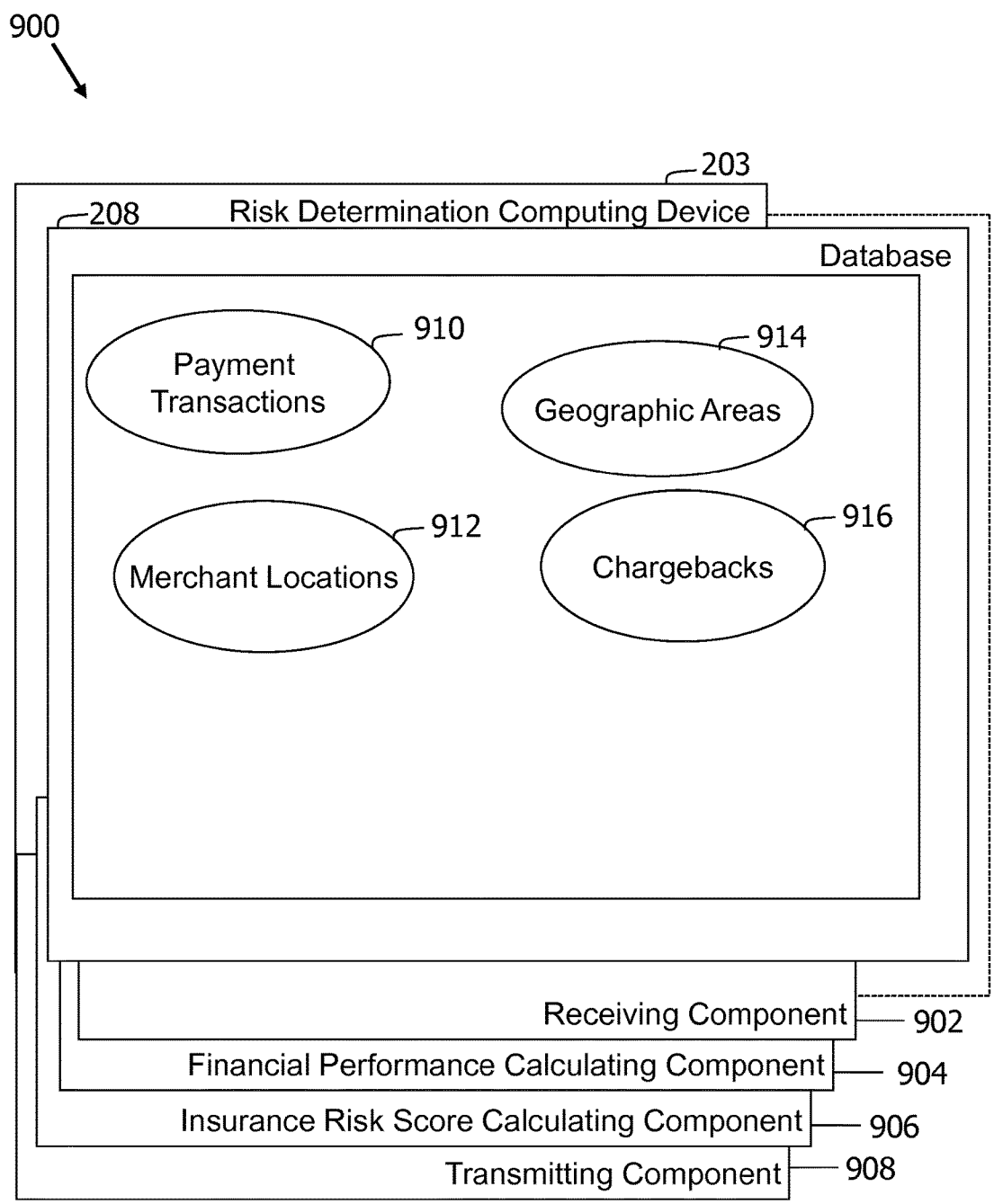

FIG. 9 is a diagram 900 of components of one or more example computing devices, for example, risk determination computing device 203, that may be used in embodiments of the described systems and methods. FIG. 9 further shows a configuration of database 208 (FIG. 2). Database 208 is in communication with several separate components within risk determination computing device 203, which perform specific tasks.

Risk determination computing device 203 includes a receiving component 902 for receiving at least one transaction record signal (e.g., transaction record signal 612) including records of a plurality of financial transactions (e.g., transaction records 614) processed by a payment processing network (e.g., payment network 128) for a first merchant (e.g., merchant 124) at a first location (e.g., location 604). Additionally, risk determination computing device 203 includes a financial performance calculating component 904 for calculating a financial performance (e.g., financial performance 710) of the first merchant (e.g., merchant 124) at the first location (e.g., location 604) from the at least one transaction record signal (e.g., transaction record signal 612). Additionally, risk determination computing device 203 includes an insurance risk score calculating component 906 for calculating an insurance risk score (e.g., insurance risk score 702) associated with at least the first location (e.g., location 604) based on the financial performance (e.g., financial performance 710). Additionally, risk determination computing device 203 includes a transmitting component 908 for transmitting an insurance risk signal (e.g., insurance risk signal 616) including a representation (e.g., representation 618) of the insurance risk score (e.g., insurance risk score 702) to an insurer computing device (e.g., insurer computing device 334).

In an example embodiment, database 208 is divided into a plurality of sections, including but not limited to, a payment transactions section 910, a merchant locations section 912, a geographic areas section 914, and a chargebacks section 916. These sections within database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system for determining an insurance risk utilize records of financial transactions processed by a payment network to provide a third party, such as an insurer, with information regarding a likelihood that a merchant was or will commit insurance fraud, such as fire insurance fraud. As a result, the methods and systems described herein enable insurers to take measures to guard themselves against the fraud and/or to prevent the fraud from occurring.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A risk determination computing device for determining a risk of property insurance fraud by a merchant, said risk determination computing device in communication with a multi-party payment card processing network, said risk determination computing device comprising:
    a memory for storing data; and
    a processor in communication with the memory, the processor configured to:
        receive at least one transaction record signal including records of a plurality of payment card transactions processed by the multi-party payment card processing network for a first merchant at a first geographic location, wherein each of the payment card transactions is associated with one of a plurality of payment cards issued by a respective one of a plurality of issuers, and wherein each of the records includes at least one transaction-type flag;
        parse the records to quantify a number of the records for which the transaction-type flag corresponds to a collusive merchant chargeback initiated by the respective one of the plurality of issuers;
        calculate an insurance risk score associated with a risk of insurance fraud relating to insured property at the first geographic location based at least in part on the quantified number of records; and
        transmit an insurance risk signal including a representation of the insurance risk score to an insurer computing device.

2. The risk determination computing device of claim 1, wherein the processor is further configured to:
    identify, from the at least one transaction record signal, a first price for a particular product sold by the merchant at a first time based on the at least one transaction record signal;
    identify, from the at least one transaction record signal, a second price for the particular product sold by the merchant at a second time that is subsequent to the first time;
    determine an amount of change between the first price and the second price; and
    calculate the insurance risk score based at least in part on the amount of change.

3. The risk determination computing device of claim 1, wherein the processor is further configured to:
    estimate, from the at least one transaction record signal, a first economic status of a first set of customers that purchased products from the first merchant during a first time period;
    estimate, from the at least one transaction record signal, a second economic status of a second set of customers that purchased products from the first merchant during a second time period that is subsequent to the first time period;
    determine an amount of change between the first economic status and the second economic status; and
    calculate the insurance risk score based at least in part on the amount of change.

4. The risk determination computing device of claim 1, wherein the records are first records, and wherein the processor is further configured to:
    receive a second transaction record signal including transactions processed by the multi-party payment card processing network for merchants at a plurality of different geographic locations within a predefined geographic area that includes the first geographic location;
    determine a change in value of the predefined geographic area based at least in part on the second transaction record signal;
    calculate the insurance risk score based at least in part on the change in value.

5. The risk determination computing device of claim 1, wherein the processor is further configured to:
    determine a change in volume of payment card transactions processed for the first merchant from a first time period to a second time period, based at least in part on the transaction record signal; and
    calculate the insurance risk score based at least in part on the change in volume.

6. The risk determination computing device of claim 1, wherein the processor is further configured to:
    receive a risk request signal from an insurer computing device, the risk request signal including the first geographic location; and
    transmit the insurance risk signal in response to the risk request signal.

7. The risk determination computing device of claim 1, wherein the processor is further configured to:
    receive a risk request signal from an insurer computing device, the risk request signal including the first geographic location and a first insurance premium associated with the first geographic location;
    calculate a second insurance premium for the first geographic location based on the insurance risk score; and
    transmit the insurance risk signal to the insurer computing device including the second insurance premium.

8. The risk determination computing device of claim 1, wherein the processor is further configured to:
    determine, from the at least one transaction record signal, a number of different payment card accounts associated with the payment card transactions processed by the multi-party payment card processing network during a predefined time period;
    estimate a number of different customers that visited the first geographic location during a predefined time period, based at least in part on the number of different payment card accounts; and
    determine a likelihood of premises liability insurance claim based on the number of different customers; and
    calculate the insurance risk score based at least in part on the likelihood of premises liability.

9. The risk determination computing device of claim 1, wherein the processor is further configured to calculate the insurance risk score by determining a risk of fire insurance fraud or vehicle insurance fraud based on the at least one transaction record signal.

10. A method for determining a risk of property insurance fraud, the method is implemented by a risk determination computing device in communication with a multi-party payment card processing network, the risk determination computing device including one or more processors in communication with a memory, said method comprising:

receiving, by the risk determination computing device, at least one transaction record signal including records of a plurality of payment card transactions processed by the multi-party payment card processing network for a first merchant at a first geographic location, wherein each of the payment card transactions is associated with one of a plurality of payment cards issued by a respective one of a plurality of issuers, and wherein each of the records includes at least one transaction-type flag;

parsing, by the risk determination computing device, the records to quantify a number of the records for which the transaction-type flag corresponds to a collusive merchant chargeback initiated by the respective one of the plurality of issuers;

calculating, by the risk determination computing device, an insurance risk score associated with a risk of insurance fraud relating to insured property at the first geographic location based at least in part on the quantified number of records; and transmitting, by the risk determination computing device, an insurance risk signal including a representation of the insurance risk score to an insurer computing device.

11. The method of claim 10, further comprising:

identifying, by the risk determination computing device and from the at least one transaction record signal, a first price for a particular product sold by the merchant at a first time based on the at least one transaction record signal;

identifying, by the risk determination computing device and from the at least one transaction record signal, a second price for the particular product sold by the merchant at a second time that is subsequent to the first time;

determining, by the risk determination computing device, an amount of change between the first price and the second price; and calculating, by the risk determination computing device, the insurance risk score based at least in part on the amount of change.

12. The method of claim 10, further comprising:

estimating, by the risk determination computing device and from the at least one transaction record signal, a first economic status of a first set of customers that purchased products from the first merchant during a first time period;

estimating, by the risk determination computing device and from the at least one transaction record signal, a second economic status of a second set of customers that purchased products from the first merchant during a second time period that is subsequent to the first time period;

determining, by the risk determination computing device, an amount of change between the first economic status and the second economic status; and calculating, by the risk determination computing device, the insurance risk score based at least in part on the amount of change.

13. The method of claim 10, wherein the records are first records, the method further comprising:

receiving, by the risk determination computing device, a second transaction record signal including transactions processed by the multi-party payment card processing network for merchants at a plurality of different geographic locations within a predefined geographic area that includes the first geographic location;

determining, by the risk determination computing device, a change in value of the predefined geographic area based at least in part on the second transaction record signal;

calculating, by the risk determination computing device, the insurance risk score based at least in part on the change in value.

14. The method of claim 10, further comprising:

determining, by the risk determination computing device, a change in volume of payment card transactions processed for the first merchant from a first time period to a second time period, based at least in part on the transaction record signal; and calculating, by the risk determination computing device, the insurance risk score based at least in part on the change in volume.

15. The method of claim 10, further comprising:

receiving, by the risk determination computing device, a risk request signal from an insurer computing device, the risk request signal including the first geographic location; and transmitting, by the risk determination computing device, the insurance risk signal in response to the risk request signal.

16. A non-transitory computer-readable storage medium having computer-executable instructions embodied thereon, wherein when executed by a risk determination computing device coupled to a multi-party payment card processing network and having at least one processor coupled to a memory, the computer-executable instructions cause the at least one processor to:

receive at least one transaction record signal including records of a plurality of payment card transactions processed by the multi-party payment card processing network for a first merchant at a first geographic location, wherein each of the payment card transactions is associated with one of a plurality of payment cards issued by a respective one of a plurality of issuers, and wherein each of the records includes at least one transaction-type flag;

parse the records to quantify a number of the records for which the transaction-type flag corresponds to a collusive merchant chargeback initiated by the respective one of the plurality of issuers;

calculate an insurance risk score associated with a risk of insurance fraud relating to insured property at the first geographic location based at least in part on the quantified number of records; and transmit an insurance risk signal including a representation of the insurance risk score to an insurer computing device.

* * * * *